Nov. 7, 1967

R. T. HEADRICK 3,351,371

SLING FOR PILLOW TANKS

Filed Oct. 4, 1965

INVENTOR.
RICHARD T. HEADRICK
BY
Christie, Parker & Hale
ATTORNEYS.

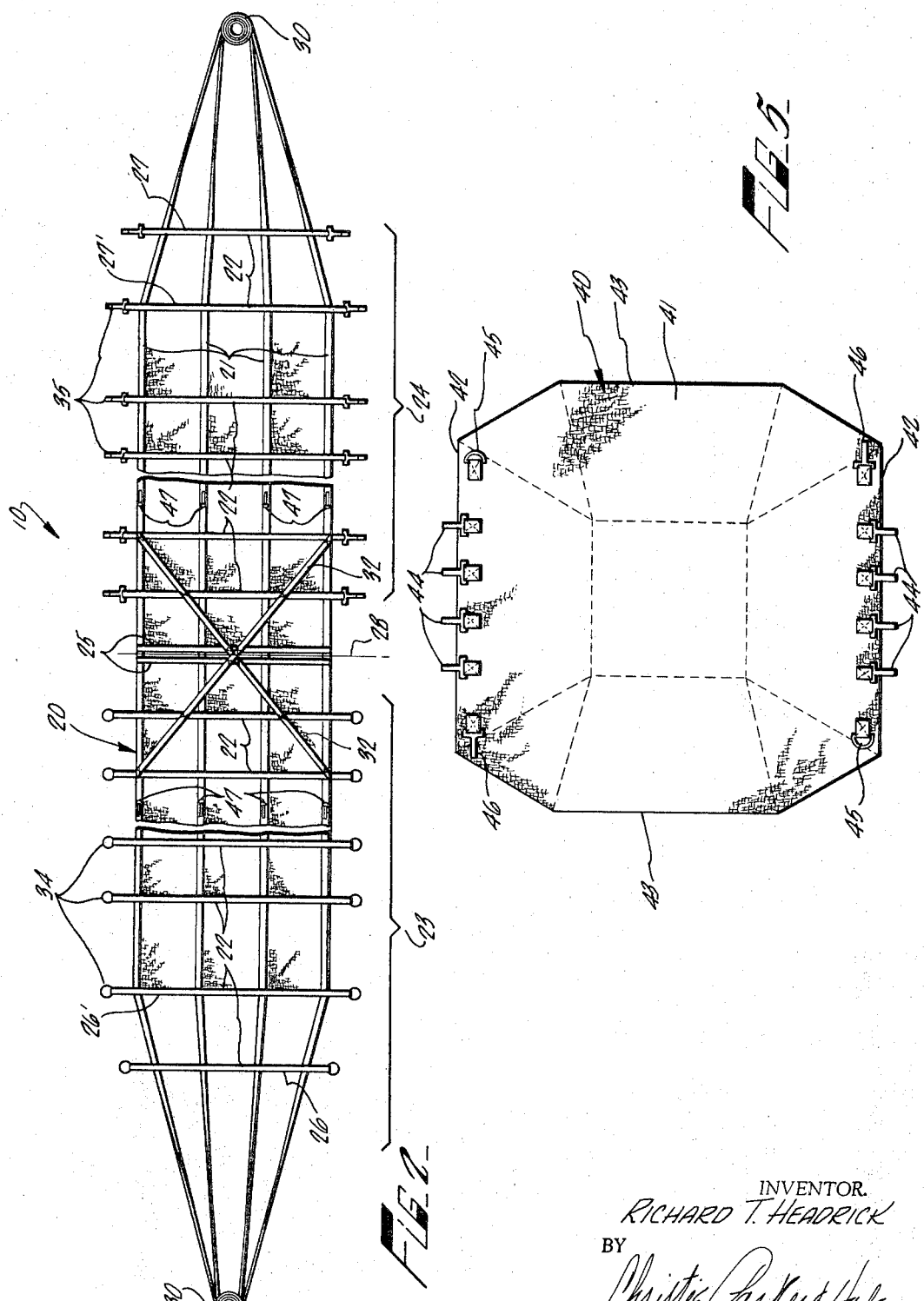

United States Patent Office 3,351,371
Patented Nov. 7, 1967

3,351,371
SLING FOR PILLOW TANKS
Richard T. Headrick, 916 Crestfield,
Duarte, Calif. 91010
Filed Oct. 4, 1965, Ser. No. 492,579
7 Claims. (Cl. 294—77)

This invention relates to cargo handling. More particularly, it relates to a sling for suspending a pillow tank from a hook.

Collapsible liquid storage tanks of high gallonage capacity and fabricated of rubberized fabric are now used with increasing frequency. Such tanks are familiarly known as "pillow tanks" in view of their pillow or sausage-like configuration when filled. In the past, because of the difficulty of moving a full or partially full pillow tank, pillow tanks have been used primarily in permanent and semi-permanent installations where their transportability is not important.

Pillow tanks obviously could be of great value to the military, particularly in tactical or brush-fire warfare situations. The difficulties attendant to the movement of full or partially full pillow tanks has militated against the most effective use of such tanks by the military. In the past, pillow tanks have been used by the military as semi-permanent auxiliary fuel tanks, for example, on aircraft because they cannot conveniently be removed from the aircraft when full or partially full. As a result, if the aircraft is attacked while on the ground during fuel transfer operations, the plane must remain on the ground until fuel transfer operations are completed. Alternatively, the aircraft is forced to leave the area before the fuel is fully transferred to some other ground-based location.

This invention provides a simple, effective, and efficient sling for carrying a full or partially full pillow tank by a helicopter in such a manner that the tank may be safely and rapidly landed from the helicopter. The sling is so constructed that the tank is suspended from a hook carried by the helicopter, but the presence of the tank does not unduly hamper or restrict the flight characteristics of the helicopter. Accordingly, the helicopter, by the use of the sling, becomes a fuel transport vehicle that need not touch ground to discharge its cargo. The sling permits optimum usage of helicopters in conjunction with modularized fuel/defuel systems in accord with my United States Patent 3,169,667 to support anti-guerilla warfare activities.

Generally speaking, this invention provides a sling for carrying a filled or partially filled elongate flexible and collapsible liquid storage tank. The sling includes a plurality of flexible, substantially inelastic straps interconnected to define an elongate net. The net has a length greater than twice the length of the tank and a width substantially equal to one-half the transverse circumference of the filled tank. Carrying loop means are provided at each end of the net. The net is foldable upon itself about substantially its midlength so that the net may be engaged with opposite longitudinal surfaces of a pillow tank extending along the net from one end thereof disposed at the midlength of the net. When the net is folded back upon itself, the portions of each longitudinal edge of the net on opposite sides of the midlength of the net are aligned with and disposed adjacent each other along the length of the tank. The net also includes releasable fastener means connected to the net at spaced locations along the longitudinal edges of the net for releasably securing together the aligned and adjacently disposed portions of the longitudinal edges of the net when the net is folded upon itself.

The above mentioned and other features of this invention are more fully set forth in the following detailed description of a presently preferred embodiment of the invention, which description is presented in conjunction with the accompanying drawings, wherein:

FIG. 2 is a top plan view, with parts broken away for simplicity of illustration, of the sling shown in FIG. 1;

FIG. 5 is a view of a scuff cover for the sling shown in FIG. 2.

Figure 1:
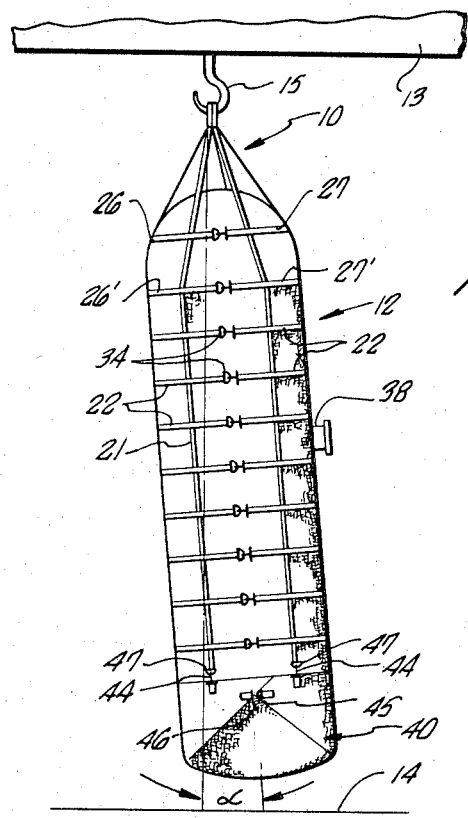
FIG. 1 is a side elevation view of a pillow tank suspended below a helicopter in a sling according to this invention.
Figure 4:
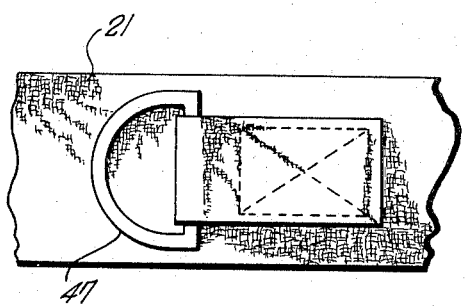
FIG. 4 is an elevation view of a portion of the flexible straps in the net shown in FIG. 2 illustrating means for connecting a scuff cover to the net.

A sling 10 according to this invention is shown in FIG. 1 supporting a full pillow tank 12 in substantially vertical relation below a helicopter 13 above the surface of ground 14. The sling is engaged at its upper end with a cargo hook 15 carried by the helicopter.

As shown in FIG. 2, the sling is comprised of an elongate net 20 fabricated from a plurality of securely interconnected, elongate, flexible and substantially inelastic straps. A plurality of longitudinal straps 21 extend along the length of the net. The net has a length greater than twice the length of pillow tank 12 for which the net is made; the size of a particular net will depend upon the size of the pillow tank with which it is to be used. The net also includes a plurality of transverse straps 22 arranged in two groups 23 and 24 of straps of equal numbers. The net also includes a pair of median straps 25 which are disposed in closely-spaced parallel relation to each other transversely of the net at substantially the midlength of the net.

The straps of group 23 are disposed parallel to each other and are spaced apart from each other along the length of the net between a first or end strap 26 adjacent one end of the net and the median straps. All the straps of group 23 are positioned on one side of the median straps. The straps of group 24 are also disposed parallel to each other and are spaced apart from each other along the net between a last or end strap 27 adjacent the other end of the net and the median straps. Corresponding ones of the straps in groups 23 and 24 are spaced equidistantly from the median straps so that when the net is folded upon itself about a line 28 transversely of the net midway between and parallel to the median straps, corresponding ones of the straps of groups 23 and 24 are registered with each other.

Between a transverse strap 26' adjacent strap 26 and the traverse strap 27' adjacent stray 27, the longitudinal straps are parallel to each other and are spaced apart transversely of the length of the net. The longitudinal straps converge at the opposite ends of the net where they are rolled and coiled upon themselves to form multi-layer circular carrying loops or rings 30.

Each of the transverse straps between and including straps 26' and 27' have a length equal to approximately one-half the transverse circumference of pillow tank 12 when filled. The opposite ends of these transverse straps are disposed substantially equidistantly outwardly from the adjacent longitudinal straps. End straps 26 and 27 are somewhat shorter than the remaining transverse straps and have their ends disposed substantially the same distance laterally outwardly from the adjacent converging longitudinal straps 21 as the next adjacent transverse straps 26' and 27'.

A pair of diagonal straps 32 are disposed in crisscross fashion across the length of the net at substantially its midlength, as shown in FIG. 2. Each diagonal strap extends from the connection of the outermost longitudinal strap to the second transverse strap left of the median straps to the connection of the corresponding strap of group 24 to the other outermost longitudinal strap.

Each transverse strap of group 23 at each end thereof is connected to a ring 34. Similarly, each transverse strap of group 24 at each end thereof is connected to a hook 35. The rings and hooks are secured to the respective ones of straps 22 by forming a bight 36 in the respective strap and engaging a corresponding portion of either the hook or the ring with the bight. The straps are stitched through the bights. The rings and hooks together comprise fastener means in the net for releasably securing together adjacent sides of the net when the net is folded upon itself about line 28.

Figure 3:
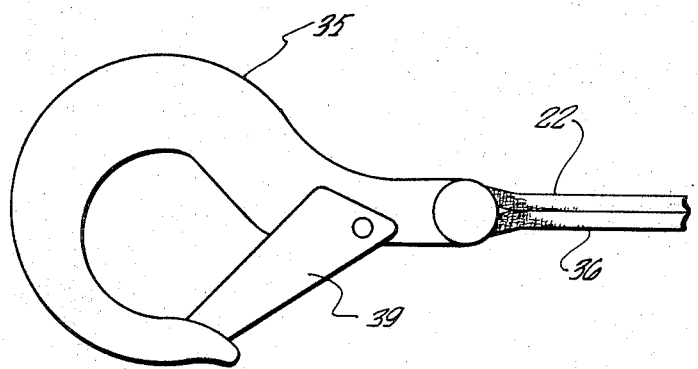
FIG. 3 is a side elevation view of a hook included in the net shown in FIG. 2.

The sling is used by placing it on the ground in a fully extended condition with the transverse straps downwardly of the longitudinal straps. Empty pillow tank 12 is then disposed lengthwise of the net over the transverse straps of group 23; one end of the pillow tank is located over the median straps. The pillow tank normally includes an inlet fitting 38 (see FIG. 1) on one side thereof at substantially midlength of the tank. The tank is disposed on the net so that the inlet fitting extends upwardly from the tank. The tank is then filled with any desired liquid, for example, gasoline. After the tank has been filled and sealed, the net is folded upon itself about line 28 so that the straps of group 24 extend transversely of the tank across the upper side of the tank, and so that the ends of these straps are aligned with and disposed adjacent to the ends of the corresponding straps of group 23. The adjacent strap ends are interconnected with each other by engaging adjacent ones of hooks 35 and rings 34. Preferably, each hook is provided with a guard 39 (see FIG. 3) so that the rings cannot be disengaged from the hooks until disengagement is desired. Lifting and carrying loops 30 at the opposite ends of the net are brought into registry with each other and are engaged with helicopter cargo hook 15. When the helicopter rises from the ground, the pillow tank, then securely contained within the sling, is carried in an essentially vertical relation below the hook.

Preferably, as indicated in FIG. 1, sling 10 is constructed so that a line between the ends of suspended pillow tank 12 makes an angle α with a vertical line through hook 15 and intersects the vertical line below the hook. Accordingly, when the suspended pillow tank is engaged with ground 14, either by lowering hook 15 from the helicopter or by lowering the helicopter toward the ground, the tank always comes to rest on the ground with its inlet fitting disposed upwardly. This result is assured by constructing net 20 so that the longitudinal straps have a greater length between strap 26 and the adjacent end of the net than between strap 27 and opposite end of the net. A value of angle α corresponding to six inches deflection from vertical per twenty feet of tank length is sufficient to assure that the tank is always disposed on the ground with the tank inlet fitting extending upwardly from the tank.

A sling constructed for use with a 2,000 gallon pillow tank includes four longitudinal straps fabricated from woven nylon strapping approximately 1¾ inches wide. Such strapping material has a nominal tensile strength of 15,000 lbs. at 1 G. Between straps 26' and 27', the longitudinal straps are spaced apart on 22 inch centers. The traverse straps and the median straps are rated at 10,000 lbs. tensile strength at 1 G. The maximum extent of the hooks and rings secured to the transverse straps is approximately 11 inches beyond the adjacent longitudinal strap. Straps 26 and 27 are each spaced approximately 20 feet 11 inches from line 28. Strap 26 is located approximately 8 feet 9 inches from the adjacent end of the net, whereas strap 27 is located approximately 8 feet 4 inches from its adjacent end of the net.

As shown in FIG. 1, a scuff cover 40 is provided around the lower or folded end of the sling when the sling is engaged with a full or partially full pillow tank. The scuff cover prevents abrasion of the pillow tank when the tank is being raised from or landed upon the ground. The scuff cover comprises a sheet 41 (see FIG. 5) of rubberized fabric sprayed with polyurethane resin to render the fabric abrasion resistant. The sheet has an octangular planform configuration defined by opposite major edges 42 and 43. Adjacent each intersection of edge 43 with an edge 42 the normally square configuration of the sheet is relieved along a straight line so that edges 42 are longer than edges 43. Four hooks 44 are secured to the sheet along each edge 42 at locations spaced apart a distance corresponding to the spacing between the longitudinal straps of net 20. One of a pair of D-rings 45 is secured to the sheet at the diagonally opposed ends of each edge 42. Similarly one of a pair of hooks 46, sized to cooperate with the D-rings, is secured to the other end of each edge 42. A pair of D-rings 47, sized to be compatible with hooks 44, are secured to each longitudinal strap of the net on opposite sides of the median straps at locations spaced from the median straps a distance equal to one-half the distance across the scuff cover between corresponding ones of hooks 44.

The scuff cover is secured to the sling by engaging hooks 44 with corresponding ones of D-rings 47 and by tucking sheet 41 into a "nurse's fold"; the sheet is secured in its tucked condition by engaging opposing ones of D-rings 45 and hooks 46.

The sling described above obviously can be made in any size desired for cooperation with any desired size of pillow tank. The sling adapts a helicopter for use as a hit-and-run fuel transport vehicle. A helicopter, with a filled pillow tank suspended from it by a sling according to this invention, can deposit the tank at any desired location without actually touching the ground. A fuel transport aircraft having a hit-and run ability is particularly valuable in the support of anti-guerilla military operations.

The use of the above-described sling to suspend a pillow tank loaded with gasoline or the like below a helicopter does not constitute a safety hazard to the helicopter, nor does it appreciably interfere with the flight characteristics of the helicopter. A 2,000 gallon pillow tank loaded with gasoline has been suspended from the cargo hook of a Chinook helicopter and the helicopter was flown safely at velocities up to and including 120 knots.

The sling described above constitutes a presently preferred embodiment of the present invention and has been described merely for the purposes of illustrating the invention. Workers skilled in the art to which this invention relates will readily appreciate that modifications or alterations in this sling may be made without departing from the scope of this invention. Accordingly, the foregoing description is not to be considered as limiting the scope of this invention.

What is claimed is:

1. A sling for carrying an elongate flexible and collapsible liquid storage tank comprising:
 (a) a plurality of flexible substantially inelastic straps interconnected to define an elongate net,
 (b) the net including a plurality of transverse straps comprised of corresponding first and second groups of parallel straps disposed transversely of the length of the net at spaced locations between a first strap and a last strap spaced apart from each other along the net a distance substantially twice the length of the storage tank, (c) the first group of transverse straps extending from the first strap toward the middle of the net and the second group of transverse straps extending from the last strap toward the middle of the net, (d) a plurality of longitudinal straps extending lengthwise of the net in substantially parallel spaced relation between said first and last straps and beyond said first and last straps, (e) ring means at each end of the net to which the opposite ends of the longitudinal straps are secured, the transverse straps having ends spaced laterally of the length of the net from the longitudinal straps, (f) cooperating releasable coupling means carried by the transverse straps at each end thereof, the coupling means carried by the transverse straps of said first group being releasably engageable with the coupling means carried by the transverse straps of said second group, and (g) a pair of closely spaced parallel median straps disposed transversely of the longitudinal straps equidistantly between the first and second groups of transverse straps and secured to the longitudinal straps, corresponding ones of the transverse straps in the first and second groups being spaced equidistantly from the median straps so that the ends of the corresponding straps are aligned with each other for interconnection by the coupling means where the net is folded upon itself about a line parallel to and midway between the median straps.

2. A sling according to claim 1 wherein the ring means at one end of the net is disposed farther from said line midway between the median straps than the ring means at the other end of the net.

3. A sling for carrying an elongate flexible and collapsible liquid storage tank comprising:

(a) a plurality of flexible substantially inelastic straps interconnected to define an elongate net, (b) the net including a plurality of transverse straps comprised of corresponding first and second groups of parallel straps disposed transversely of the length of the net at spaced locations between a first strap and a last strap spaced apart from each other along the net a distance substantially twice the length of the storage tank, (c) the first group of transverse straps extending from the first strap toward the middle of the net and the second group of transverse straps extending from the last strap toward the middle of the net, (d) a plurality of longitudinal straps extending lengthwise of the net in substantially parallel spaced relation between said first and last straps and beyond said first and last straps, (e) the longitudinal straps at each end of the net being gathered and arranged to define a supporting ring for the net, the transverse straps having ends spaced laterally of the net from the longitudinal straps, and (f) cooperating releasable coupling means carried by the transverse straps at each end thereof, the coupling means carried by the transverse straps of said first group being releasably engageable with the coupling means carried by the transverse straps of said second group.

4. A sling for carrying an enlongate flexible and collapsible liquid storage tank comprising:

(a) a plurality of flexible substantially inelastic straps interconnected to define an elongate net, (b) the net including a plurality of transverse straps comprised of corresponding first and second groups of parallel straps disposed transversely of the length of the net at spaced locations between a first strap and a last strap spaced apart from each other along the net a distance substantially twice the length of the storage tank, (c) the first group of transverse straps extending from the first strap toward the middle of the net and the second group of transverse straps extending from the last strap toward the middle of the net, (d) a plurality of longitudinal straps extending lengthwise of the net in substantially parallel spaced relation between said first and last straps and beyond said first and last straps, (e) ring means at each end of the net to which the opposite ends of the longitudinal straps are secured, the transverse straps having ends spaced laterally of the length of the net from the longitudinal straps, (f) cooperating releasable coupling means carried by the transverse straps at each end thereof, the coupling means carried by the transverse straps of said first group being releasable engageable with the coupling means carried by the transverse straps of said second group, and (g) a scuff cover for the sling comprising a sheet of heavy fabric material, and (h) fastener means for releasably securing the scuff cover to the net so that the scuff cover overlies a central portion of the net.

5. A sling according to claim 4 where the fastener means comprises a plurality of hooks secured to each of a pair of opposite edges of the scuff cover at spaced locations along said edges, and two corresponding pluralities of rings secured to the net at correspondingly spaced locations transversely of the net, the two pluralities of rings being disposed on opposite sides of and equidistantly from a line transversely of the net midway between said first and last transverse straps.

6. A sling according to claim 5 including cooperating linking means at opposite locations of the scuff cover for releasably interconnecting said opposite locations when the scuff cover is secured to the net by the fastener means and the net is folded upon itself about said line.

7. A sling for carrying an elongate flexible and collapsible liquid storage tank comprising:

(a) a plurality of flexible straps interconnected to define an elongate net including (i) a pair of median straps extending transversely of the net at approximately the midlength thereof in close parallel spaced relation to each other, (ii) a plurality of transverse straps comprised of corresponding first and second groups of parallel straps disposed, respectively, laterally of and on opposite sides of the median straps, each of the first and second transverse strap groups including an end strap spaced from the median straps a distance substantially equal to the length of the tank, the remaining transverse straps of each group being spaced from each other between the end strap of their respective group and the median straps at corresponding locations along the net, and (iii) a plurality of longitudinal straps extending lengthwise of the net in parallel spaced relation between said transverse straps and extending beyond said end transverse straps to the ends of the net, (iv) the transverse straps exclusive of the end straps having equal lengths equal to substantially one-half the transverse circumference of the filled tank and having ends disposed laterally outwardly from the longitudinal straps, (v) the end transverse straps having equal lengths shorter than the remaining transverse straps, (b) ring means defined by the longitudinal straps at each end of the net, one ring means being disposed farther from a line transversely of the net midway between the median straps than the other ring means, (c) a ring secured to each end of each transverse strap comprising one of said groups,
(d) a hook secured to each end of each transverse strap comprising the other of said groups for releasable engagement with a corresponding ring when the net is folded upon itself about said line,
(e) a scuff cover for the net, and
(f) means for releasably connecting the scuff cover to the net so that the scuff cover extends around the outside of the net and encloses the net in the vicinity of the median straps when the net is folded upon itself about said line.

References Cited

UNITED STATES PATENTS

| 1,144,544 | 6/1915 | Hicks | 294—77 |
| 3,084,966 | 4/1963 | Higgins | 294—77 |
| 3,120,975 | 2/1964 | Tillman | 294—77 X |

FOREIGN PATENTS 222,561  7/1962  Austria.

GERALD M. FORLENZA, *Primary Examiner.*

G. F. ABRAHAM, *Assistant Examiner.*